United States Patent [19]

Lohr

[11] 4,084,836
[45] Apr. 18, 1978

[54] PEDAL CAR

[76] Inventor: Raymond J. Lohr, 5043 Sterrettania Rd., Erie, Pa. 16506

[21] Appl. No.: 742,185

[22] Filed: Nov. 16, 1976

[51] Int. Cl.² .............................................. B62M 1/04
[52] U.S. Cl. ..................................... 280/254; 280/257
[58] Field of Search ....................... 280/226, 252–258; 74/126, 130, 131

[56] References Cited

U.S. PATENT DOCUMENTS

| 91,379 | 6/1869 | Spofford et al. ................. 280/254 X |
| 875,467 | 12/1907 | Slotkin ................................. 280/254 |
| 904,062 | 11/1908 | Hamill ................................. 280/254 |
| 1,420,799 | 6/1922 | Wilkinson .......................... 280/254 |
| 1,535,950 | 4/1925 | Schramke ........................ 280/254 X |
| 1,604,888 | 10/1926 | Dews ................................. 280/254 |

FOREIGN PATENT DOCUMENTS 923,983 7/1947 France ................................. 280/257

Primary Examiner—Joseph F. Peters, Jr.
Assistant Examiner—Terrance L. Siemens
Attorney, Agent, or Firm—Charles L. Lovercheck

[57] ABSTRACT

A pedal car having a body with a seat and a steering wheel and rear wheels supported on an axle. Ring gear sectors are supported on the car and connected to two pedals which the rider can oscillate. Two spaced pinions on the axle engage the ring gear at diametrically opposite parts and two one-way clutches connect the axle to the pinions so that the ring gear drives the axle forward when it is oscillated in one direction by pedals and drives the axle forward again. When the ring gear is oscillated in the opposite direction by the other pedal, the axle is rotated again in the same direction.

12 Claims, 4 Drawing Figures

U.S. Patent    April 18, 1978    4,084,836
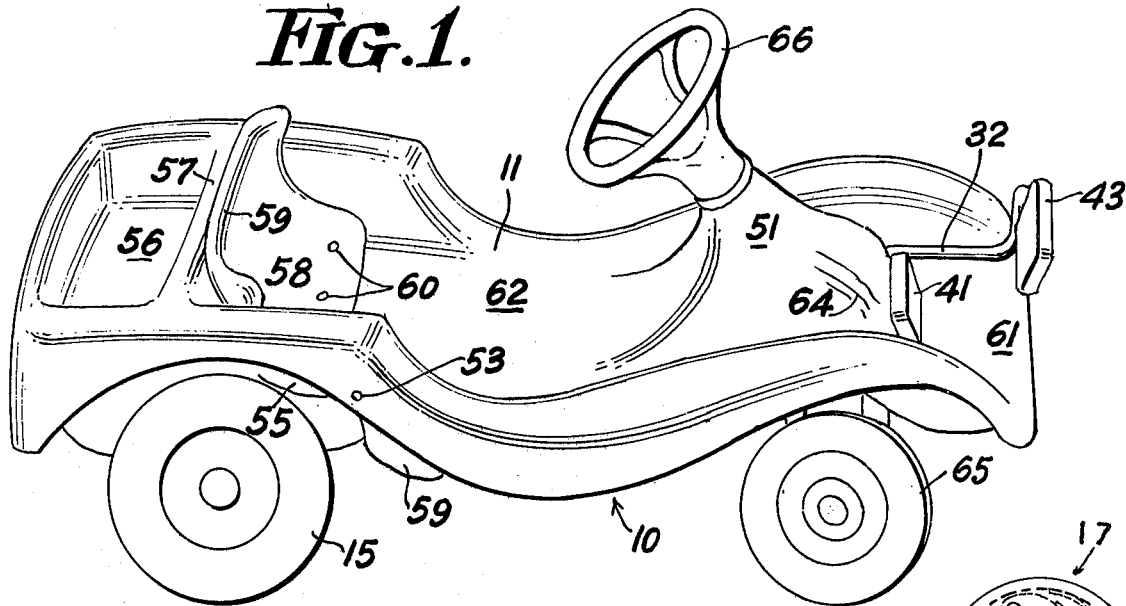
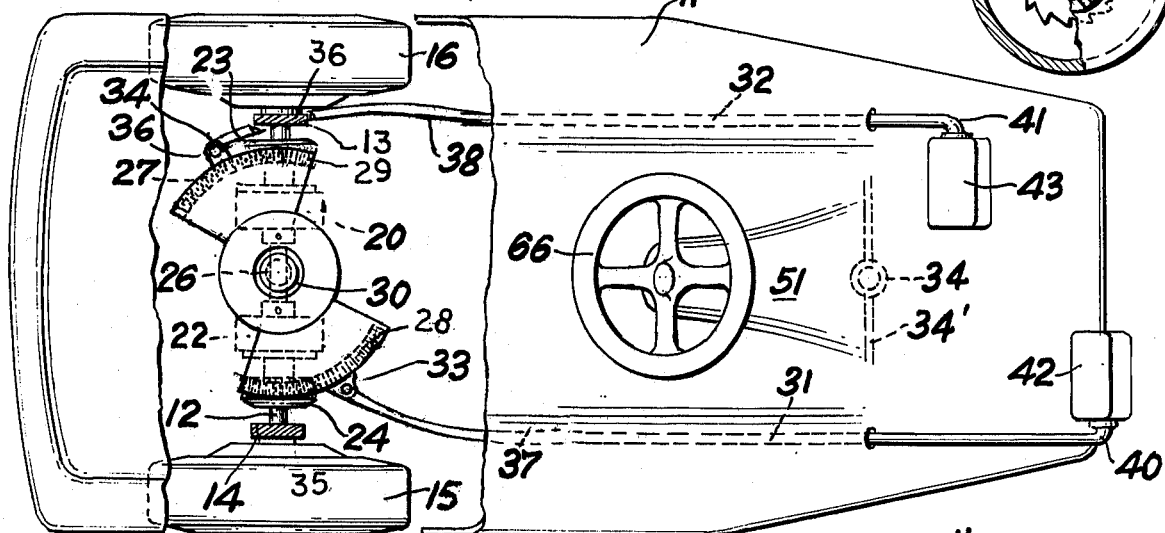
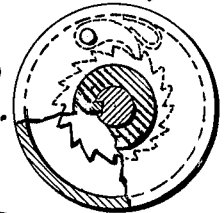
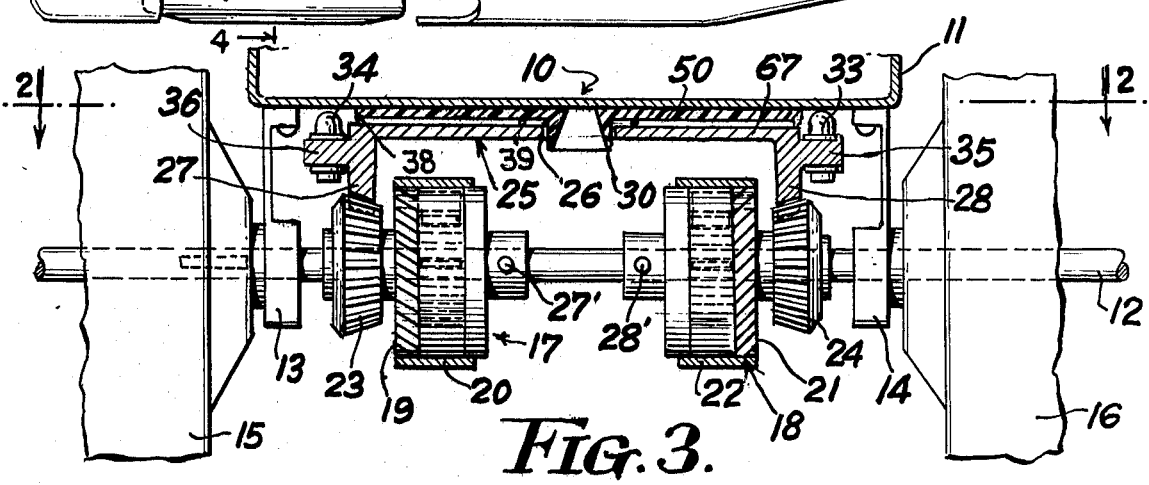

PEDAL CAR

REFERENCE TO PRIOR ART

The pedal car disclosed herein constitutes an improvement over the pedal cars such as shown in U.S. Pat. No. 1,767,047 and U.S. Pat. No. 2,464,942.

OBJECTS OF THE INVENTION

It is an object of the invention to provide an improved pedal car.

Another object of the invention is to provide a pedal car that is simple in construction, economical to manufacture and simple and efficient to use.

Another object of the invention is to provide an improved drive in a pedal car.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages on the invention.

GENERAL DESCRIPTION OF DRAWINGS

FIG. 1 is a side view of the car according to the invention.

FIG. 2 is a top view of the car with parts broken away to show the drive mechanism.

FIG. 3 is a longitudinal cross-sectional view taken on line 3—3 of FIG. 2.

FIG. 4 is a cross-sectional view taken on line 4—4 of FIG. 2.

DETAILED DESCRIPTION OF DRAWINGS

Now, with more particular reference to the drawings, the car indicated generally at 10, has a body 11 which may be streamlined to provide an interesting and pleasing appearance. It has four wheels and a drive mechanism which includes a rear axle 12 supported to the body by bearing members 13 and 14 which are fixed to the bottom of the body by suitable screws as shown and freely receive the axle 12. Wheels 15 and 16 are supported on the axle 12 and one or both of the wheels 15 and 16 may be fixed to the axle to rotate with it to propel the car.

The bearing plate 50 is fixed to the underside of the body 11 by suitable fastening means such as rivets. However, it could be cemented in place or molded with the body. Plate 50 has annular beads 38 and 39 which provide a bearing surface for the plate 67 of the ring gear 25. The downwardly-extending boss 30 is fixed to the center of the plate 50 and is received in the hole 26 in the center of the plate 67 of ring gear 25. The plate 67 is held up against the boss 30 by the pinions 23 and 24.

The ring gear has spaced tooth sectors 27 and 28 with downwardly-extending teeth which engage the pinions 23 and 24. The teeth are arranged in an arcuate path. The one-way clutches 17 and 18 have outer members 20 and 22 which are attached to shaft 12 by pins 27' and 28' and inner members 19 and 21 are fixed to pinions 23 and 24 to rotate with them. Both the pinions 23 and 24 and inner members 19 and 21 freely rotate on the shaft 12.

The teeth on pinions 23 and 24 engage the teeth on tooth sectors 27 and 28 respectively on the ring gear. The pedals 42 and 43 are supported on the inwardly turned forward ends 41 and 40 of the pedal rods 31 and 32. The pedal rods 31 and 32 extend through openings in the partitions 64 in the body, and are curved in an arcuate path adjacent the rear end to clear the ring gear as the pedals oscillate the ring gear backward and forward about the boss 30. The rear end of the pedal rods 31 and 32 have their rear ends turned downwardly and are received in the lugs 35 and 36 which are attached to the ring gear sectors 27 and 28.

Seat 58 is supported on the body by fasteners 60 and a "trunk" space 56 is defined by walls 57 and formed in the body for the occupant to carry toys or other paraphernalia. Upstanding part 51 has a hole through which the steering column attached to the steering wheel 66 extends. The front wheels 65 may be supported on L-shaped axle 67 which are connected to a suitable tie rod of a conventional type familiar to those skilled in the art.

When the occupant forces the left pedal forward, for example, the ring gear 25 is rotated clockwise approximately 30 degrees about the boss 30, rotating the pinion 23 forward through clutch 17 rotating the axle and wheels 15 and 16 in a forward direction while pinion 24 is rotated in the opposite direction and the clutch freewheels. When the pedal 41 is pushed forward, the ring gear 25 is rotated in the opposite direction and the gear sector 28 rotates the pinion 24 in a forward direction causing clutch 18 to drive and clutch 17 to freewheel. The inner member of the clutch 18 rotates the outer member 22 of the clutch through the ratchet member inside the clutch and since the outer member is attached to it, it is rotated in a forward direction. Thus, the wheels 15 and 16 are rotated in a forward direction when each of the pedals 42 and 43 are alternately pushed forward and rearward.

The foregoing specification sets forth the invention in its preferred practical forms but the structure shown in capable of modification with a range of equivalents without departing from the invention which is to be understood is broadly novel as is commensurate with the appended claims.

The embodiments of the invention in which an exclusive property or privilege is claimed are defined as follows:

1. A pedal car having a body, said body having a seat, a rear axle, a bearing means rotatably supporting said rear axle on said car, ground-engaging wheels on said axle, at least one said ground engaging wheel being fixed to said axle to rotate therewith, a bearing plate having a boss thereon fixed to said body a ring gear having downwardly-disposed teeth and a central opening rotatably receiving said boss, pinions rotatably received on said axle and engaging said teeth on said ring gear, a first one-way clutch having a first part and a second part, and a second one-way clutch having a first part and a second part, said first parts of said one-way clutches being fixed to said pinions, said second parts of said one-way clutches being fixed to said axle, two spaced forwardly-extending rods connected to said ring gear at opposite sides thereof whereby said ring gear is rotated in first direction when said first pedal rod is pushed forward rotating said axle in a first direction through said first one-way clutch, and said ring gear is rotated in a second direction when said second pedal rod is pushed in a forward direction rotating said axle in a second direction through said second one-way clutch.

2. The car recited in claim 1 wherein said ring gear is supported on said boss by said pinions.

3. The car recited in claim 1 wherein said ring gear is divided into two sectors, one said sector having teeth engaging a first pinion and said second sector having teeth engaging a second pinion.

4. The car recited in claim 1 wherein pedals are disposed substantially on a level with said seat whereby a child sitting on said seat and having his feet resting on said pedals when said pedals are in a forward position will have his legs substantially horizontal.

5. The car recited in claim 2 wherein said ring gear has a plate having said central openings therein and said ring gear plate is disposed in a plane parallel to the plane of the bearing plate.

6. The car recited in claim 3 wherein said ring gear has downwardly-extending tooth sectors thereon having teeth engaging said sprockets and outwardly-extending lugs are attached to each said tooth sector having a lug thereon, and a hole in each said lug, and said rods each having a downwardly-turned end on the rear thereof in said openings in said lugs.

7. A pedal car comprising
a body,
a rear axle supporting said body,
a ring gear having a central opening thereon,
boss means on said body extending into said opening in said ring gear providing a pivot point for said ring gear,
two spaced pinions on said axle,
said ring gear having downwardly-extending teeth engaging each said pinion,
two spaced one-way clutches supported on said axle between said pinion,
each said one-way clutch having a member attached to a said pinion and a second member attached to said axle whereby said pinion is rotated in a first direction, causing said clutch to freewheel and, when it rotates in a second direction, to drive said axle through said clutch to rotate said wheel in a forward direction.

8. The car recited in claim 7 wherein said ring gear is supported on said boss by said pinions.

9. The car recited in claim 7 wherein said ring gear is divided into two sectors, one said sector having teeth engaging a first pinion and said second sector having teeth engaging a second pinion.

10. The car recited in claim 7 wherein pedals are disposed substantially on a level with said seat whereby a child sitting on said seat and having his feet resting on said pedals when said pedals are in a forward position will have his legs substantially horizontal.

11. The car recited in claim 8 wherein said ring gear has a plate having said central openings therein and said ring gear plate is disposed in a plane parallel to the plane of the bearing plate.

12. The car recited in claim 8 wherein said ring gear has downwardly-extending tooth sectors thereon having teeth engaging said sprockets and outwardly-extending lugs are attached to each said tooth sector having a lug thereon, and a hole in each said lug, and said rods each having a downwardly-turned end on the rear thereof in said openings in said lugs.

* * * * *